United States Patent [19]
Severson et al.

[11] Patent Number: 5,773,939
[45] Date of Patent: Jun. 30, 1998

[54] COMMAND CONTROL FOR MODEL RAILROADING USING AC TRACK POWER SIGNALS FOR ENCODING PSEUDO-DIGITAL SIGNALS

[76] Inventors: Frederick E. Severson, 945 SW. Perfecta Ave., Beaverton, Oreg. 97005; Patrick A. Quinn, 20195 SW. Imperial Dr., Aloha, Oreg. 97006

[21] Appl. No.: 480,679

[22] Filed: Jun. 7, 1995

Related U.S. Application Data

[63] Continuation-in-part of Ser. No. 127,630, Sep. 27, 1993, Pat. No. 5,448,142, which is a continuation-in-part of Ser. No. 12,364, Feb. 1, 1993, Pat. No. 5,394,068, which is a division of Ser. No. 480,078, Feb. 14, 1990, Pat. No. 5,184,048, which is a division of Ser. No. 37,721, Apr. 13, 1987, Pat. No. 4,914,431, which is a continuation-in-part of Ser. No. 672,397, Nov. 16, 1984, abandoned.

[51] Int. Cl.$^6$ ........................................................ H02P 7/00
[52] U.S. Cl. ................... 318/51; 104/DIG. 1; 246/187 A
[58] Field of Search ...................... 318/280–286, 318/16, 34, 51, 53, 54, 59, 67, 587; 388/807–815; 104/300–303, DIG. 1; 242/187 R, 187 A, 187 B, 270 R, 219, 221, 220; 340/825.69, 825.7, 825.73, 825.76, 825.57, 825.59

[56] References Cited

U.S. PATENT DOCUMENTS

| | | | |
|---|---|---|---|
| 3,955,129 | 5/1976 | Wagner et al. ............................. | 318/55 |
| 4,341,982 | 7/1982 | Lahti et al. ............................... | 318/51 |
| 5,174,216 | 12/1992 | Miller et al. ............................. | 104/296 |
| 5,267,318 | 11/1993 | Severson et al. .................... | 340/384 E |
| 5,341,453 | 8/1994 | Hill .......................................... | 388/815 |
| 5,451,017 | 9/1995 | Graff et al. ............................. | 246/220 |

*Primary Examiner*—Jonathan Wysocki
*Attorney, Agent, or Firm*—Marger, Johnson, MCollom & Stolowitz, P.C.

[57] ABSTRACT

Apparatus and methods are disclosed for transmitting very fast digital DC signals over the track for remote control in a model railroad layout, by selecting positive and negative lobes from the applied AC track power signal. This method allows digital transmission at 120 Hz rate that can be used within a 60 Hz AC system. This is fast enough to be used for Digital Command Control (DCC) and also capable of delivering large power output efficiently without the expense of filtering or exotic electronic control circuits. This method also has low sensitivity to electrical noise and does not generate significant noise during operation. We describe methods of transmitting and receiving positive and negative lobes and methods to extend this technology. We also describe other areas where this technology can be applied such as remote control of appliances connected to any AC power environment such as home or industrial electric power systems.

14 Claims, 10 Drawing Sheets

NORMAL AC PRODUCES A SERIES OF
ALTERNATING DIGITAL "1s" AND "0s"

FIG.3a

POSITIVE RECTIFIED AC PRODUCES
A SERIES OF DIGITAL "1s"

FIG.3b

NEGATIVE RECTIFIED AC PRODUCES
A SERIES OF DIGITAL "0s"

BINARY EXAMPLE 1
DIGITAL WORD=1,1,0,1,0,0,0

FIG.5a

BINARY EXAMPLE 2
DIGITAL WORD=1,0,1,0,1,0,0

FIG.5b

BINARY EXAMPLE 3
DIGITAL WORD=+1,+1,−1,0,−1,−1,−1

FIG.5c

CONTROL SIGNAL GENERATOR

FIG.6

± D.C. SIGNAL GENERATORS

FIG.7
PRIOR ART

FIG. 8 CONTROL

FIG.9

FIG. 10a DISCRETE CIRCUITRY METHOD

MICROPROCESSOR
METHOD

FIG.11

COMMAND CONTROL FOR MODEL RAILROADING USING AC TRACK POWER SIGNALS FOR ENCODING PSEUDO-DIGITAL SIGNALS

This application is a continuation-in-part of U.S. application Ser. No. 08/127,630, filed Sep. 27, 1993, now U.S. Pat. No. 5,448,142 which is a continuation-in-part of U.S. Ser. No. 08/012,364, filed Feb. 1, 1993, now U.S. Pat. No. 5,394,068, which is a division of U.S. Ser. No. 07/480,078, filed Feb. 14, 1990, now U.S. Pat. No. 5,184,048, which is a division of U.S. Ser. No. 07/037,721, filed Apr. 13, 1987, now U.S. Pat. No. 4,914,431, which is a continuation-in-part of U.S. Ser. No. 06/672,397, filed Nov. 16, 1984, now abandoned.

BACKGROUND OF THE INVENTION

Three methods of controlling electric trains has evolved over the years. The first and most simple has been to use either DC or 50/60 Hertz sine wave power. The second method views the model railroad track as a transmission medium for high frequency remote control signals. The third uses remote control signals to carry digital words to decoders in the engine for digital command control of locomotives and other accessories. While the first method is very reliable and usually easier and cheaper to produce, the high frequency techniques allow for an increased number of signals. The third technique can potentially allow for even more control since it can use each remote control signal as a carrier of digital information. A brief description of the historical development of all three systems and a discussion of their pro's and con's follows.

AC and DC power and remote control for model trains: In 1906, a simple variable transformer was introduced by Lionel to lower the voltage range from the wall to a safe value and allow the user to control the speed of his electric train by changing the amplitude of the applied 60 Hertz sine wave AC track power. In the 1920's, Lionel included remote control reversing switches (E-Units) to allow the user to control the direction of his train by interrupting the applied track power. When DC powered trains with permanent magnet motors were introduced, a different standard was developed for most two rail trains where the direction of trains were controlled by the polarity of the DC track power applied to the track. In the late 1940's Lionel added a new concept of applying DC superimposed to the AC track voltage to turn on and off an on-board whistle by remote control. In the nineteen eighties, Lionel introduced their method of using both negative and positive DC superimposed on AC track to control two different remote control effects; Lionel chose to use the positive DC signal to turn a horn sound effect on and off and used the negative DC signal to turn a bell sound effect on and off. In 1984, we defined an on-board sound system for three-rail AC layouts that used the positive and negative DC signals along with a on-board state generator to increase the number of possible remote control effects. In 1993, we described another system for DC powered trains that used polarity reversal as remote control signal. The biggest problem with most DC and AC systems is that there are a limited number of remote control signals available and the application is slow by modern digital standards.

High Frequency Transmission on Model Railroad track: About 1946, Lionel pioneered the idea of high frequency transmission when they introduced the Lionel Electronic Train Control. This system supplied ten different signals ranging from 240 to 360 kHz that would control ten different remote control effects. The different high frequency signals were superimposed on the standard AC sine wave 60 Hertz power when selected buttons were pressed at the control center. Each remote engine or rail car was equipped with a receiver unit that was tuned to the individual frequencies. When the correct high frequency signal was transmitted, the corresponding receiver would toggle or turn-on some remote effect.

Although these high frequency signals increase the remote control effects, they had other problems. In the Lionel repair manual, they point out that transmission losses are high and that it is most important to keep the track, the track joints and the wheels of the receiving car or locomotive, very clean. They also suggest that extra feeder wires to different parts of the layout should be used to prevent signal losses. In addition, capacitors across the track joints and added inductors at the power supply and each accessory was suggested to reduce signal loss and achieve proper operation.

Electrical noise is also a problem at these higher frequencies since noise from motor commutators will generate considerable energy in these frequency bands. The remote control signal needs to be large enough to provide a useful signal to noise ratio. Lionel, of course, was only using each frequency to control one effect at a time. If digital information is transmitted on a signal frequency as a carrier, the requirements for improved signal to noise can become a significant design issue.

Signal loss and signal power are also problems. In terms of signal power for a model railroad, high frequency signals are usually better suited than low frequency signals. First of all, the impedance of the track is very low (1 or 2 ohms) at low frequencies (DC to 1 kiloHertz). If the remote control signal is in this range, it will need to be a very robust power source since it will be supplying power to the motors and other electrical appliances on the track such as lights, smoke generators, and other electrical or electronic accessories. In other words, the remote control signal power source will need to be about as robust as the sixty Hertz AC or filtered DC applied power in terms of delivering power to this low impedance environment. The advantage of high frequency (such as 200 to 400 kHz), is that the impedance of the track usually increases because the motors, and some electrical accessories look inductive at these frequencies. Hence it is easier and cheaper to develop signal sources to supply signal power to this higher impedance track environment. However, the higher the frequency the greater the signal lose down the track from radiation and ohmic loss. Not only is the track a dissipative transmission medium but signal strength is lost through track joints, locomotive wheels, etc. If the frequency becomes too high, it becomes quite impractical to use the track as a transmission channel.

Over the years, other manufacturers have introduced different methods of applying high frequency signals to the model train track to increase the remote control capabilities including independent train control where independent train control means that the operator can control the speed, direction and features of a number of different engines all on the same powered track section.

Digital Command Control (DCC): Command control is a method of controlling individual engines, rail cars and accessories by transmitting digital remote control signals down the track to on-board digital receivers and decoders in the remote objects. Command control has been around since the 1970's but had not received wide acceptance because of the limited technology at the time and the difficulty and expense of installing receivers in each engine. Also, like high frequency transmission, DCC systems can have problems with signal and data loss.

Transmission is usually done at a reasonably high baud rate to allow for error correction and real time control of many different trains and accessories by many different controllers. If there is any momentary loss of signal between track and engine, digital information can be lost or corrupted. Error correction encoding plus continual re-transmission of the same information are usually employed to reduce the transmission and receiving errors.

Over the last ten to fifteen years there have been many new contributors to this market and customers have been confused about which system is best. Recently, the NMRA (National Model Railroad Association) established a preferred method of transmitting and receiving digital transmissions on model train layouts, based on the Lenz system developed in Germany. This recommended method borrows from current modem technology and uses PSK (Phase Shift Keying) of an AC pulse drive between a positive 20 and negative 20 voltage supply to transmit digital signals at a very high data rate (9600 baud). The one's and zero's of digital transmission are produced by varying the pulse width of the applied voltage. Since the digital signal is actually the applied power, the signal to noise ratio is improved over methods where the digital signal is superimposed on the normal track power.

With the added advantages of command control, a growing number of model train operators are willing to convert to these new systems. While these new DCC methods are a good approach for use in low power trains (such as HO, N, Z and some G), it has some limitations in the area of power hungry larger and older model trains that require large current from the power supplies. For these types of layouts, the power supply design can become expensive because of the amount of filtering and electronics required. One problem is that at large currents, the discontinuous pulse drive outputs can create excessive noise. Also, transmission of high frequency digital signals can deteriorate over long distances and often require fine tuning of your layout with extra feeder wires and capacitors across rail joints to decrease signal loss.

For model trains that require large currents, its preferable to use standard 60 Hertz AC sine waves applied to the track since it is readily available and can be efficiently produced at high power levels. Also, for these AC powered trains, it is possible to use the method of superimposing DC signals onto the applied AC track power to do digital transmission. In our U.S. Pat. No. 4,914,431, we describe using DC for digital transmission and described methods of transmitting, receiving and decoding these signals to produce digital logic.

For instance, DC signaling can be used for a simple counting scheme to select any engine from a number of engines that each have a unique identification number (ID number). In this case, each time a DC signal is received, an on-board counter in the engine advances one state. When the count equals the ID code number, that engine is selected. This is both simple and easy to implement with present AC transformers but it can become unwieldy when the number of engines becomes large where, perhaps, one hundred or so applications of DC might be required. Since there are two DC signals available, it would be better to use both positive and negative DC to, say, transmit both a logic "1" as plus DC and a logic "0" as minus DC. Now, to address engine #100, only seven applications of either plus or minus DC would be required (i.e. $(+,+,-,-,+,-,-)=(1,1,0,0,1,0,0)_2=(100)_{10}$). If additional digital information is needed for each addressed engine, the digital word could be lengthened to supply either on-off operations or a digitized analog signal to control some special function such as engine speed. This might take, say, an additional eight bits or eight separate applications of either plus or minus DC.

However, even with the use of both positive and negative DC, it is not clear that DC can be transmitted sufficiently fast for real time digital control of model trains; it is important to know the limits of how fast DC signals can be transmitted and how much digital information is required for each command signal. For most AC powered trains such as Lionel, a DC signal superimposed on 60 Hertz power is not expected to be fast since it only turns on a single effect. It seems to push the limits of practicality to have even two separate DC signals used within a one second time interval which, of course, would be much too slow to control trains digitally real time. The present invention, however, shows a method to transmit DC signals that is, indeed, fast enough for real time digital applications. Although it is not nearly as fast as current NMRA standard DCC, it does have the advantage of high power, low cost and low noise sensitivity.

SUMMARY OF THE INVENTION

Figure 7:
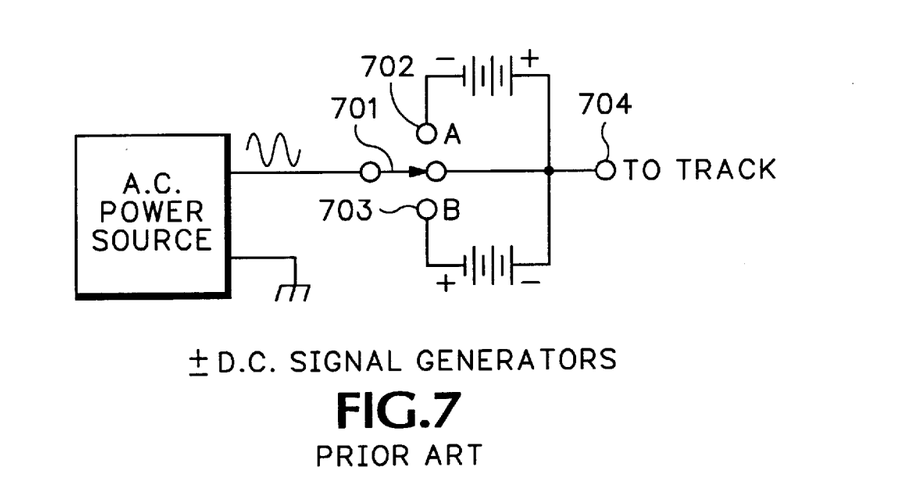
FIG. 7 shows a simple method of applying superimposed DC onto AC track power.

If DC signals are applied to the track by pressing a button as shown in FIG. 7 (of U.S. Pat. No. 4,914,431), even transmitting a word of 16 bits could be time consuming. If this were an application where you wished to address and control the speed of several engines, each with an eight-bit ID code and an eight-bit speed control command, it would appear to take too much time to be practical. It would be useful to determine how quickly a DC digital bit can be transmitted by pressing and releasing the button faster and faster until some practical limit presents itself.

Obviously, when switch 701 is moved from plus to minus fast enough, the AC applied power would start to interfere with the signal value of the applied DC. This occurs since, after all, applying DC in alternate directions once ever half cycle starts to look like the applied AC; in other words, aliasing occurs between the AC voltage and the constantly changing DC. However, if the switch is applied exactly at each zero crossing of the AC power, and the switch is left on for exactly one half of a cycle, then a DC signal could be transmitted once each half cycle of applied AC or for U.S. power standards, once every $\frac{1}{120}$ second. With this scheme, a 16 bit digital word could be transmitted each $\frac{16}{120}$ of a second or 7.5 words a second which is fast enough to addresses and command from 1 to four engines without noticing delays.

Figure 1:
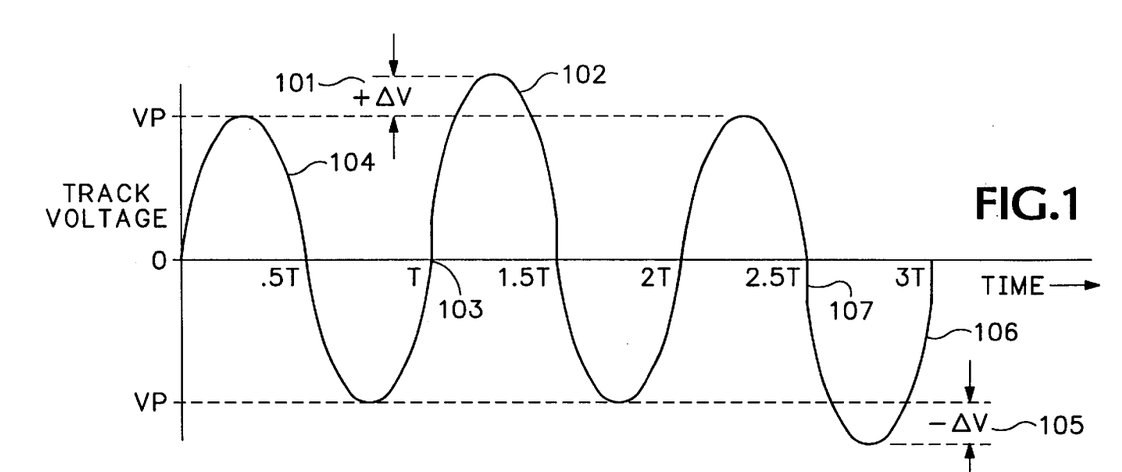
FIG. 1 shows an example of DC offset signals superimposed during half period segments of AC sine wave track power.

FIG. 1 shows three cycles of applied power with base line AC voltage of peak value, VP, and where a DC signal of strength, +V, 101, is applied from t=T to t=1.5 T. The AC wave form, 102, shows a jump at T, 103, and shows a DC offset over the half cycle from T to 1.5 T compared to the normal base line AC power half cycle, 104. Normal AC power is restored from 1.5 T to 2 T. At t=2.5 T a DC signal of strength, −V, 105, is applied from t=2.5 T to t=3.0 T. The AC wave form, 106, shows a negative jump at 2.5 T, 107, and shows a negative DC offset over the half cycle from 2.5 T to 3 T compared to the normal base line AC power half cycle, 104.

Part of the problem with this technique is the need to always compare each half cycle of AC power detected in a receiver with the base AC half cycle where no DC is applied.

During heavy transmission of digital information, while the applied track voltage is being changed, it would be difficult to determine what was a normal base line value. It would help if DC offset was large since it could reduce the influence of a changing AC amplitude during detection but this would cause changes in the applied power to the track and could increase the peak track voltage over the acceptable limits allowed for the model railroading environment.

Figure 2:
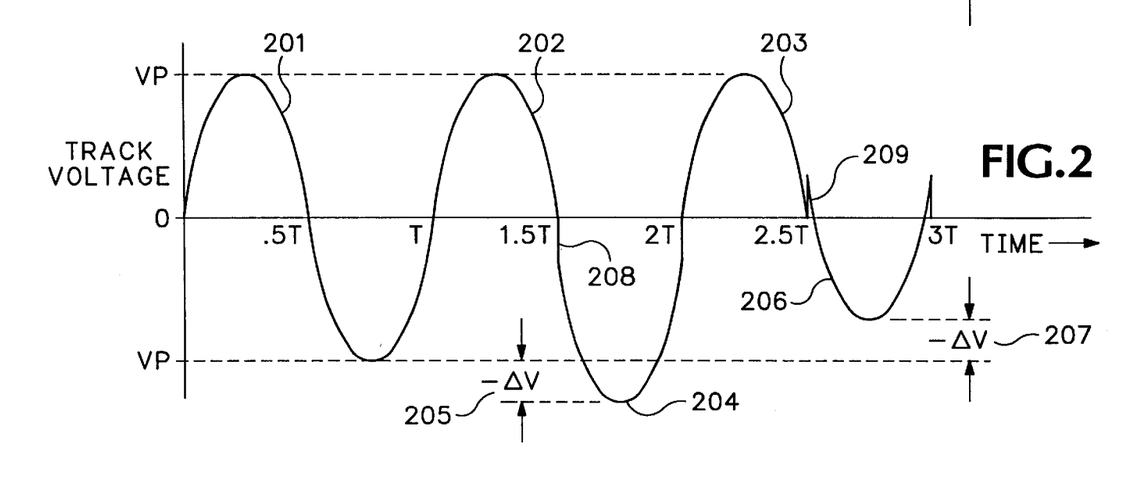
FIG. 2 shows an example of DC offset signals superimposed only during negative half period segments of AC sine wave track power.

Another method might be to always transmit one half cycle of applied AC of known polarity followed by one half cycle with the applied DC signal superimposed. FIG. 2 shows three cycles of applied power. All positive half cycles, 201, 202 and 203, are normal AC with peak value VP and are used to determine a base line value. At t=1.5 T, a DC signal of strength, −V, 205, is applied from t=1.5 T to t=2 T. Since all positive half cycles are of known value (as measured by the area under the curve), when the absolute area of AC wave-form section, 204, is compared to any positive half cycle, it will show a clear negative DC offset. In a similar way, the wave form, 206, at t=2.5 T to t=3 T has a DC offset applied but this time it is a positive V, 207. Again, the absolute value of the area of this wave-form section will show that it has a positive DC offset.

This method would lower the transmission rate to 3.75 16 bit words per second which might limit its application for real time digital train control. Also, both techniques have other problems. Applying a step function DC offset causes discontinuities at the zero crossing such as 103 and 107 in FIG. 1 and 208 and 209 in FIG. 2. When applied to inductive loads such as motors, etc. this can cause excessive electrical noise. In addition, detectors that can reliability measure small amounts of DC offset over half periods of applied power are difficult to design. What is needed is a DC wave form to superimpose on the AC track voltage that would: 1) cause no discontinuities in the applied track voltage, 2) not change the area under the curve and 3) provide a large amount of DC that would be easy to detect.

Figure 3A:
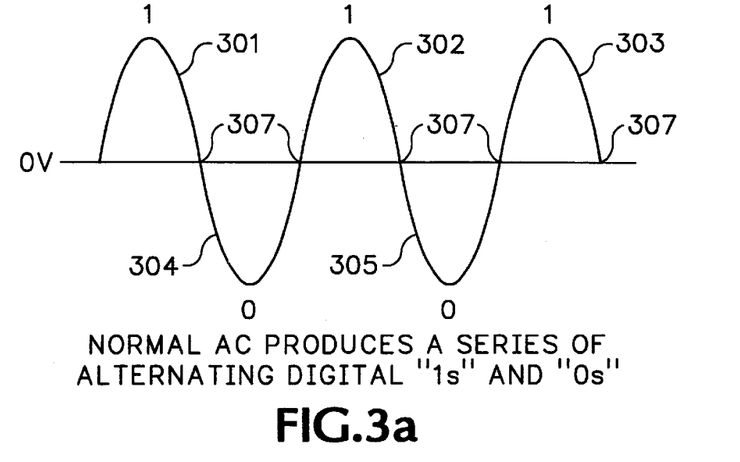
FIGS. 3a, 3b and 3c. show the digital lobe transmissions for normal sine waves, positive full wave and negative full wave track power respectively.
Figure 3B:
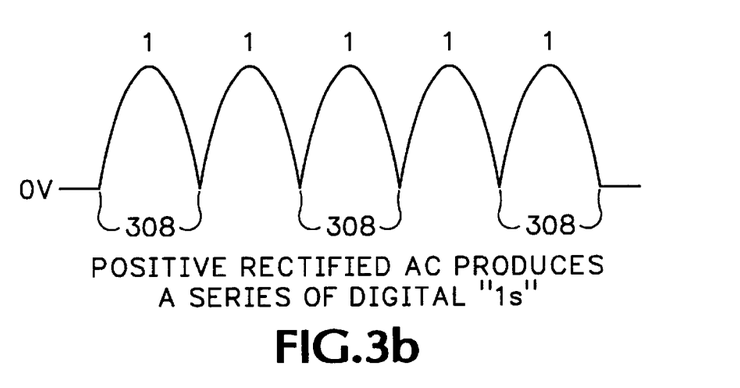
Figure 3C:
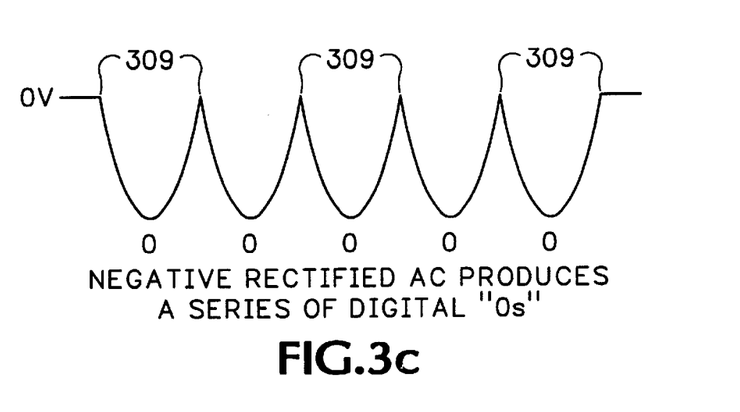

According to one aspect of the present invention, instead of adding positive DC to an already existing AC wave form, we transmit a positive half cycle of the applied power. Instead of adding negative DC to an already existing AC wave form, we transmit a negative half cycle of the applied power. We define the positive half cycle or positive AC lobe as a digital "1" and the negative half cycle or negative AC lobe as a digital "0". Then we can transmit any combination of digital bits we like. It is quite easy to develop circuits that can take applied AC and either pass it through or invert it on command at each half cycle. To illustrate, consider normal AC power shown in FIG. 3a; the digital signal would be an endless stream of ones and zeros alternately (1,0,1,0,1,0,1, 0,1,etc.). In FIG. 3a, positive lobes are shown as 301, 302, and 303; negative lobes are shown as 304, and 305. However, if we did full wave rectification to produce the wave forms shown in FIG. 3b or 3c, we would be transmitting either all "1's" or all "0's". Note that in case of the pure AC sine waves in FIG. 3a, each bit is separated by a zero crossing 307. In FIG. 3b and FIG. 3c, the bits are separated by areas where the voltage is near zero, 308 and 309 respectively which represent the zero crossing of the original AC applied power to the rectifiers.

Figure 4:
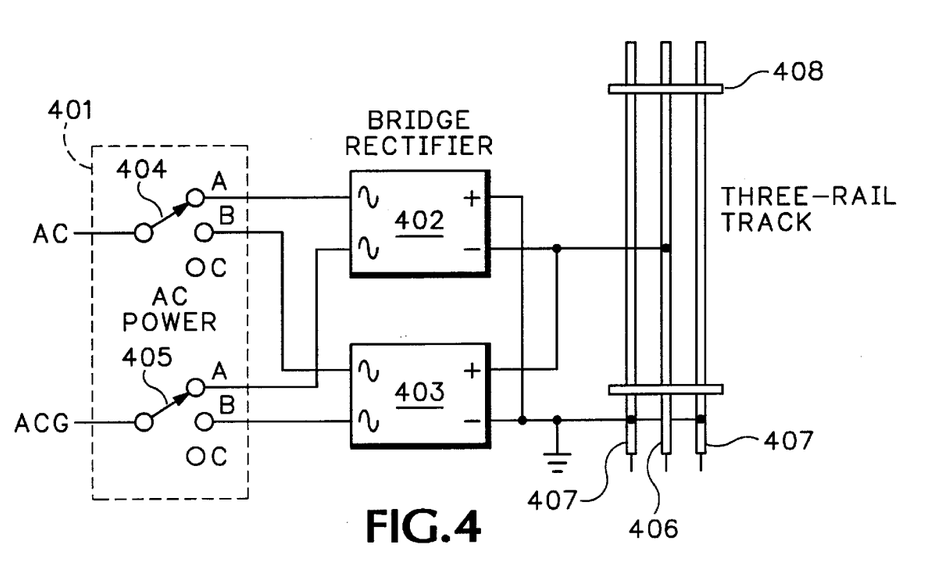
FIG. 4 shows a circuit for selectively applying plus or minus AC lobes to the track.

To generate an arbitrary digital word, we switch to positive or negative full wave rectification at every ac zero crossing to produce any desired set of "1's" or "0's". The diagram in FIG. 4 shows 60 Hertz AC applied to a double-pole triple-throw switch 401 which connects to two separate bridge rectifiers, 402 and 403, where the outputs of the bridges are connected with opposite polarities to the three-rail track, 408.

Figure 5A:
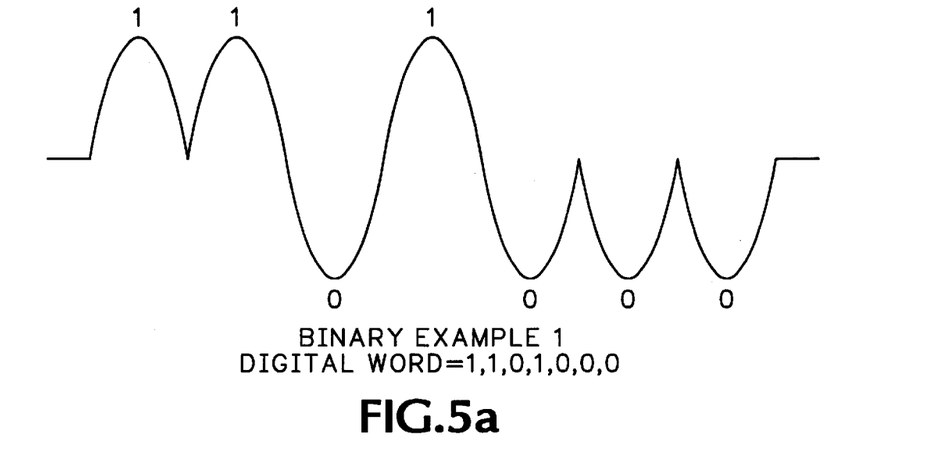
FIG. 5a, 5b and 5c are example wave forms and their digital content by using the circuit in FIG. 4.
Figure 5B:
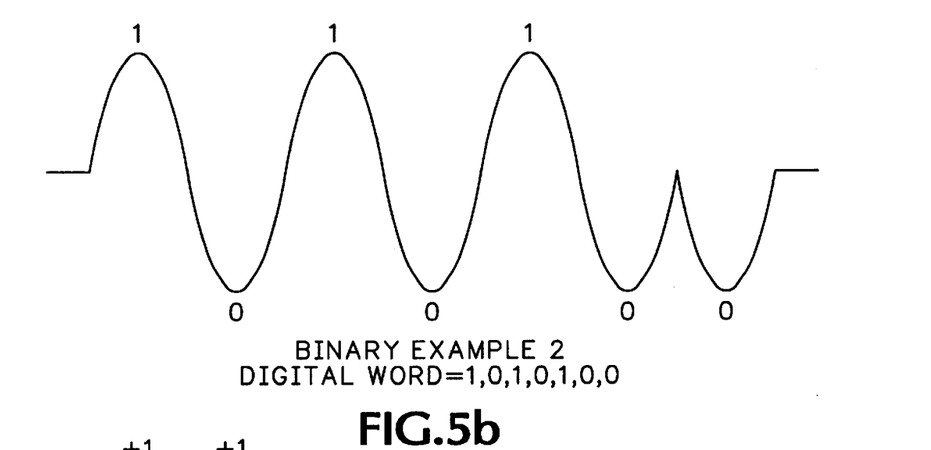
Figure 5C:
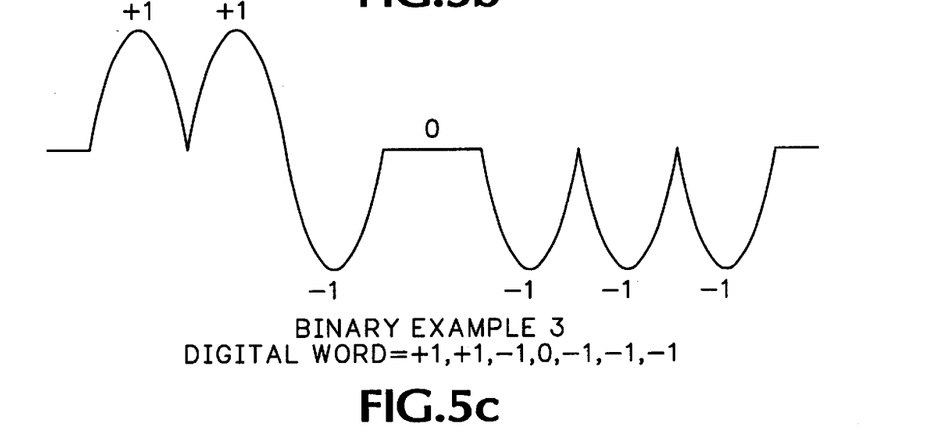

When the switch arms, 404 and 405, are in the A position, negative DC full wave rectified pulses, or a stream of logic "0's" are applied to the center rail, 406, of the track with respect to the ground rails, 407, at a rate of 120 bits per second. When the switch arms, 404 and 405, are in the B positions, positive full wave rectified pulses, or a stream of logic "1's" are applied to the center rail, 406, of the track with the respect to the ground rails, 407, at a rate of 120 bits per second. If the switch arm, 404 and 405, are either changed or not changed at each AC zero crossing to produce either a digital one or a digital zero DC signal, then any arbitrary digitized word can be sent to the track at a rate of 120 bits per second. A number of examples are shown in FIGS. 5a, 5b and 5c.

An advantage of this transmission technique is that it does not require any change to the layout or engines and delivers the same power to the track regardless of what information is being transmitted. It has a relatively high transmission rate of one bit per 1/120 second which would be 7.5 sixteen-bit words per second—plenty fast for most model railroad applications. Also, all electrical loads that I am aware of for three-rail model railroad track will work on either DC or AC applied power. Hence, the information transmitted in the digital words (such as all "1's") will not result in loss of function of accessories or negatively effect AC powered engine performance.

In DC powered two rail trains, the only significant load that is sensitive to the type of applied power is the DC "can" motors that are normally connected directly across the two rails and will not operate on AC power. Hence, digital signals that have both "1's" and "0's" may cause these motors to overheat. However, if the user opted to use command control using this technique of AC lobe transmission, he would also add a receiver to each engine and this would convert any applied power to DC for his motors. Hence, this system is equally adaptable to two-rail scale operation as well. In fact, this transmission technique could be applied to many industrial or home environments for remote control operation of various machines and appliances directly from the applied power. The only requirement appears to be that all of the loads on the AC power line must operate satisfactory under all conditions of applied digital signals. This is not usually a restrictive condition. If the average DC content of the applied signal is a problem, there are encoding algorithms for sending plus and minus DC pulses that ensures an average zero value DC content.

The circuit in FIG. 4 can also be used to transmit trinary logic where a logic +1 is represented by a positive lobe, a logic −1 is represented by a negative lobe and a logic zero is represented by no output. When switch arms, 404 and 405, are in the A position, logic +1's are applied to the center rail. When the switch arms are in position B, logic −1's are applied to the center rail and when the switch arms are in position C, logic zeros are applied to the center rail. An example of trinary logic output is shown in FIG. 5c.

The disadvantage of using full trinary logic is that each logic "0" reduces the applied power to the track. However, limited use of the "0" logic state can sometimes be used to advantage. One application is to mark the beginning and/or end of transmitted words. This has a definite advantage when applying these digital techniques to a two-rail system. If full trinary logic were used, a method could be applied where the applied peak voltage of each AC lobe would increase in proportion to the number of "0's" used in order to maintain average constant applied power to the track.

AC lobe digital transmission is fast enough (120 baud) that the user would seldom notice any delay in the response of his engines or accessories. In fact, if many users were sending data and each address and control word were stored in a first-in first-out buffer to the track, there could be more than one user, each controlling his own engines or accessories independently without noticeable delay in response time. This would allow this system to be used in large club layouts were many operators would each have their own throttle to operate their own selected engines all at the same time without appearing to interfere with each other. There are other methods that can be used to increase the effective data rate. For instance, if there is no request to change to another receiver with a different ID number, instead of sending our the same address word over and over again, only the information about speed and/or other requests need to be sent for the already selected engine. Also, if a speed change is requested, only the change in speed could be sent which reduces the number of required bits. Note, while the preferred embodiment described herein uses 50/60 Hz, it is possible to use the data transmission and detection methods of lobing at any desired frequency.

Figure 6:
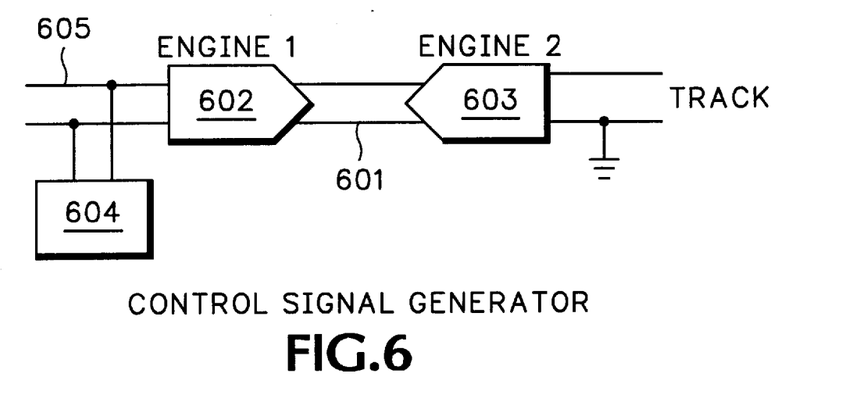
FIG. 6 shows how the present invention can be applied to for two-rail trains.

Digital DC logic applied to two-rail scale operation: FIG. 6 shows two engines, 602, 603, facing each other on a single section of track where one rail, 601, is shown as reference ground. The two rails are connected to control signal generator, 604. Since the locomotive do not know which way they are facing, there is no way for them to identify the correct polarity of the applied digital signal to the track. If we use a trinary "0" followed by logic +1, the engine will be able to evaluate the correct polarity of the received signal. For instance, it the locomotive receives a negative lobe after a trinary "0", it knows that it is facing in reverse and that it should invert all incoming lobes to the opposite polarity.

AC lobe signals for remote control of Lionel whistles: Actually, since we can control how many positive lobes and negative lobes are transmitted on the average, we can control the average amount of DC delivered to the track. This means that we can use this technique to control both the older and new style three-rail AC powered trains. As mentioned in the section "Background for the Invention", AC powered three-rail trains uses positive or negative DC superimposed on the AC track power to turn or the whistle and/or horn or to control the bell respectively. In commonly-owned, co-pending application Ser. No. 08/127,630 it is noted that Lionel developed an unusual way of applying the DC to the track to blow the whistle as described below.

Lionel chose to use a special relay that would ignore AC and respond only to the presence of DC. This relay required a sizable amount of DC (1.1v to 3v) before the relay would close. Once closed, however, it only required a small amount (300–500 mV) to stay in the closed position. Unfortunately, if 5v or more of DC was maintained on the track, the relay would often become magnetized and stay in the closed position even after the DC signal had been removed. Also, it was difficult to provide a sustained large-voltage DC signal from available rectifiers of the time that would not over-heat at the current levels required by Lionel motors. Lionel solved these problems by designing their DC remote control technique to use a lever or button that would first make contract to a source of half-wave rectified voltage and then to make contact to a second terminal that applied the full amount of track AC with a sustained superimposed 300 to 500 mV of DC. Although the half-wave rectified signal for the first contact would decrease the power to the track by more than half, it provided a very strong DC source signal and it was applied only long enough to close the horn relay in the engine. The first contact is called "horn position one" and the second contact is called "horn position two".

When new electronic horns and whistles were introduced, electronic detectors were also introduced that would respond the superimposed DC on the track. Unfortunately, these detectors required that the DC voltage component on the track exceed the amount necessary to turn on a silicon p-n junction (about 0.7 to 0.9 v). The older Lionel transformers only produced this amount when the transformer horn button was in horn position one where half wave DC was applied. Since this reduces the power, the engines with the new electronic detectors would slow down when the whistle effect is operating even with the benefit of the whistle boost winding on their early transformers. With the transformer in horn position 2, the horn would often shut off completely or go off intermittently.

Also, when no horn signal was applied, the electronic horns had the annoying problem of periodically going off from noise on the track. This did not happen as often with the earlier horn design since the horn relay had built in hysteresis that required a "position 1" signal to get the horn to operate followed by a "position 2" signal to keep it closed. The new electronic detectors could have been designed to maintain this standard by having hysteresis designed into the circuit. In other words, a large DC signal would be required to turn on the detector (horn position 1) and only a small amount required to keep in on (horn position 2). With the extra advantage of having the horn DC signal always start with a large amount of DC, the detector circuit could be designed to be more responsive to the large "position 1" horn signals to turn on quickly and, at the same time, more immune to noise spikes of DC on the track that are below the hystersis threshold.

Most modern Lionel transformers now only have a single horn position that produces from 0.8 to 5 volts of DC offset. It would have been an advantage for Lionel designers to stay within the existing standard to provide better horn detectors. Engineers and designers could have used the two horn positions to do other effects such as having the horn change pitch from horn position one to horn position two. The standard could easily have been expanded to have the value of DC voltage control some feature in a continuous analog manner (the pitch could vary continuously from a low to a high value depending on the amount of DC, etc.).

Clearly, our method of selecting positive and negative AC lobes has relevance here. Since we can control the amount of average DC on the track, we can control either the older type of two position horns or apply sufficient average DC to control new electronic horns. In addition, we could vary the amount of average DC in an analog manner to control horn pitch, etc. Applying negative average DC can control the bell sound effect.

In addition, it is possible to operate both engines that do not have CTT AC lobe receivers and new engines that do from the same control center. It is also possible to control both at the same time on the same powered track section independently allowing for compatibility of older engines with new CTT equipped engines.

Summary: In addition to being a very simple system, the use of AC lobe signals on the track also has a number of practical remote control advantages over most systems that use digital encoding on a high frequency carrier to transmit the necessary commands: 1) it can easily apply large amounts of power for large current engines, 2) it is easy to make either a positive or negative lobe, 3) lobe signals are very immune to electrical noise from motors and other electronics on the track, 4) there is negligible signal loss over large distances, 5) it is compatible with older engines that are not equipped with new signaling electronics and 6) AC lobes do not have wave form discontinuities that can generate excessive EMI.

The foregoing and other objects, features and advantages of the invention will become more readily apparent from the following detailed description of a preferred embodiment which proceeds with reference to the drawings.

DETAILED DESCRIPTION OF A PREFERRED EMBODIMENT

Figure 8:
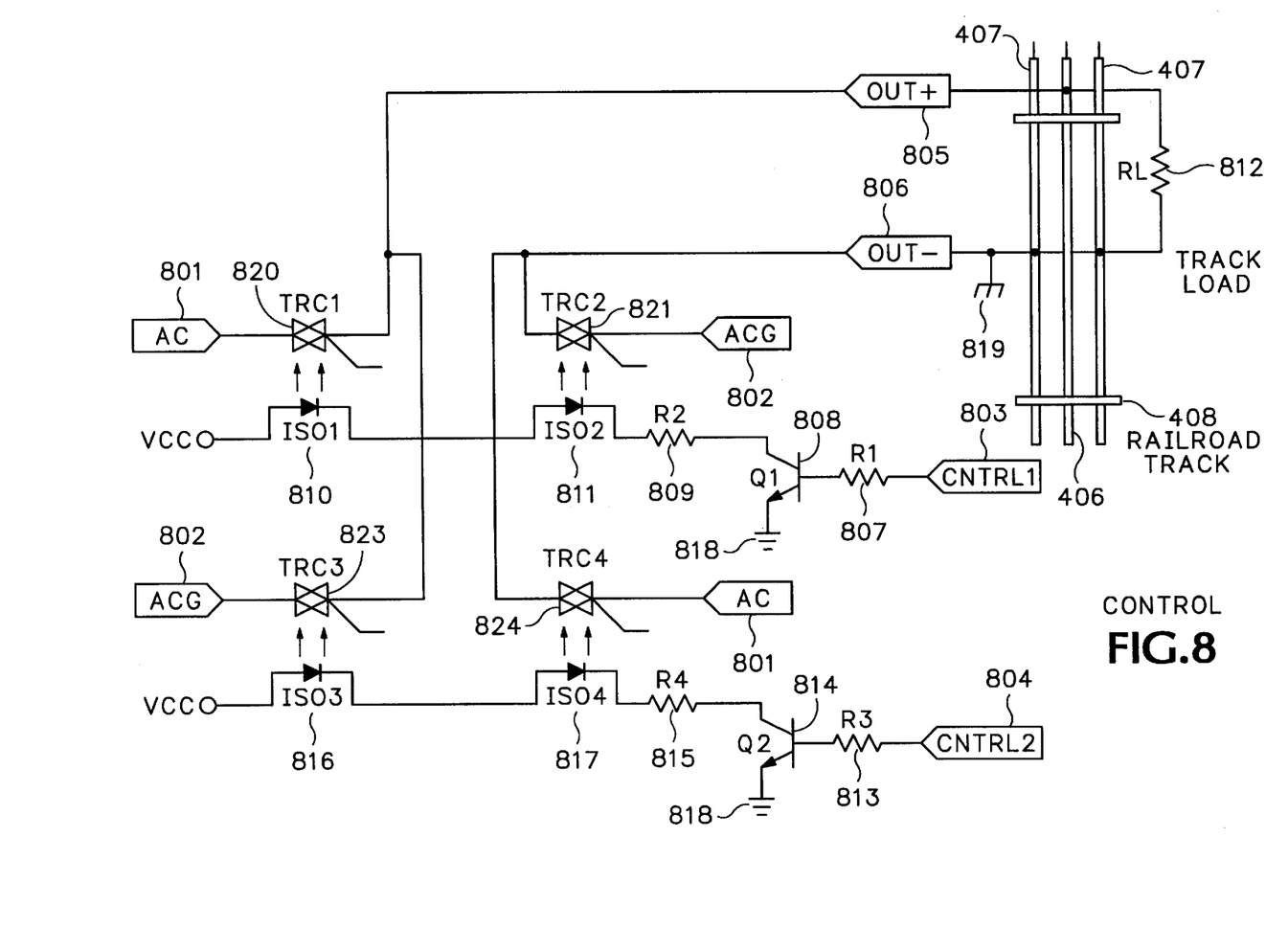
FIG. 8 is an electrical schematic of a digital lobe transmitter.

Digital Signal Transmitter: One method of producing AC power lobes, positive, negative or missing, is shown in FIG. 8. A twenty five volt AC sine wave power supply across 801 and 802. The center rail, 406, of track, 408, is connected to output, 805, and outside rails, 407, are connected to output, 806. A resistor, RL, is connected across the track between center rail, 406, and outside rails, 407, to represent the electrical load of the engine and train. The outside rails, 407, are considered reference ground, 819, which is not related to electronic ground, 818, or to either ACG, 802. If control input "CNTRL1" 803 and "CNTRL2" 804 are held at 0 volts then the output signal developed across 805 and 806 will have zero volts. This condition is called zero lobe and represents no power applied to the track.

When the phase of the input AC power is between 0 degrees and 180 degrees (801 is positive respect to 802) then a positive lobe is produced at the output to the track (outside rail is reference ground) by applying a positive control signal to CNTRL1, 803, and zero volts to CNTRL2 804. On the other hand, when the phase of the input AC power is between 180 degrees and 360 degrees (802 is positive respect to 801) then a positive lobe is produced at the output to the track by applying a positive control signal to CNTRL2, 804, and zero volts to CNTRL1, 803.

TABLE 1

| POLARITY OUT+ – OUT– | CONTROL 1 | CONTROL 2 | AC POWER POLARITY |
|---|---|---|---|
| Positive Lobe | +5 V | 0 V | 0 Deg–180 Deg |
|  | 0 V | +5 V | 180 Deg–360 Deg |
| Negative Lobe | 0 V | +5 V | 0 Deg–180 Deg |
|  | +5 V | 0 V | 180 Deg–360 Deg |
| Zero Lobe | 0 V | 0 V | All |

When the phase of the input AC power is between 0 degrees and 180 degrees (802 is negative respect to 801) then a negative lobe is produced at the output to the track (outside rail is reference ground) by applying a positive control signal to CNTRL2, 804, and zero volts to CNTRL1 803. On the other hand, when the phase of the input AC power is between 180 degrees and 360 degrees (802 is positive respect to 801) then a negative lobe is produced at the output to the track by applying a positive control signal to CNTRL1, 803, and zero volts to CNTRL2 804.

The circuit in FIG. 8 is basically a programmable bridge rectifier with control inputs CNTRL1, 803, and CNTRL2, 804. The first control condition is when CNTRL1 is positive and CNTRL2, is zero. When CNTRL1, 803, is positive, base current flows through R1, 807, causing transistor Q1, 808, to saturate which in turn causes the collector to be pull close to electronic ground, 818. This causes current to flow in resistor R2, 809. This current in turn flows through control LED's of opto-isolating Triac drivers ISO1, 810, and ISO2, 811. That turns on Triacs, TRC1, 820, and TRC2, 821, which completes a circuit from input 801 to output 805, through a load, RL, 812, on the track back through output, 806, and back to return power, 802. With CNTRL2, 804, at zero, no base current flows into Q2, 814, and neither Triac driver, ISO3, 816, or ISO4, 817, is on and neither Triacs, TRC3, 823, nor TRC4, 824, is conducting.

The second control condition is when CNTRL2 is positive and CNTRL1, is zero. When CNTRL2, 804, is positive, base current flows through R3, 813, causing transistor Q2, 814, to saturate which in turn causes its collector to be pull close to electronic ground, 818. This causes current to flow in resistor R4, 815. This current in turn flows through control LED's of opto-isolating Triac drivers ISO3, 816, and ISO4, 817. That turns on Triacs, TRC3, 823, and TRC4, 824, which completes a circuit from input 802 to output 805, through a load 812 on the track back through output 806 and back to return power 801. With CNTRL1, 801, at zero, no base current flows into Q1, 808, and neither Triac driver, ISO1, 810, or ISO2, 811, is on and neither Triacs, TRC1, 820, nor TRC2, 821, is conducting.

The third condition is where both CONTR1, 803, and CNTR2, 804, are both at zero volts with respect to electronic ground, 818. Under these conditions all Triac's are off and no power is applied to the track, 408 and load, RL, 812.

The forth condition is where both CONTR1, 803, and CNTR2, 804, are both positive with respect to electronic ground, 818. Under these conditions all Triac's are on and a short circuit condition exists between AC inputs, 801 and 802. This is a condition that is not used and must be avoided. The electronic control signals at 803, and 804 can be easily designed to prevent the condition where both inputs are positive. In addition, short circuit protection can be added as extra measure.

Figure 9:
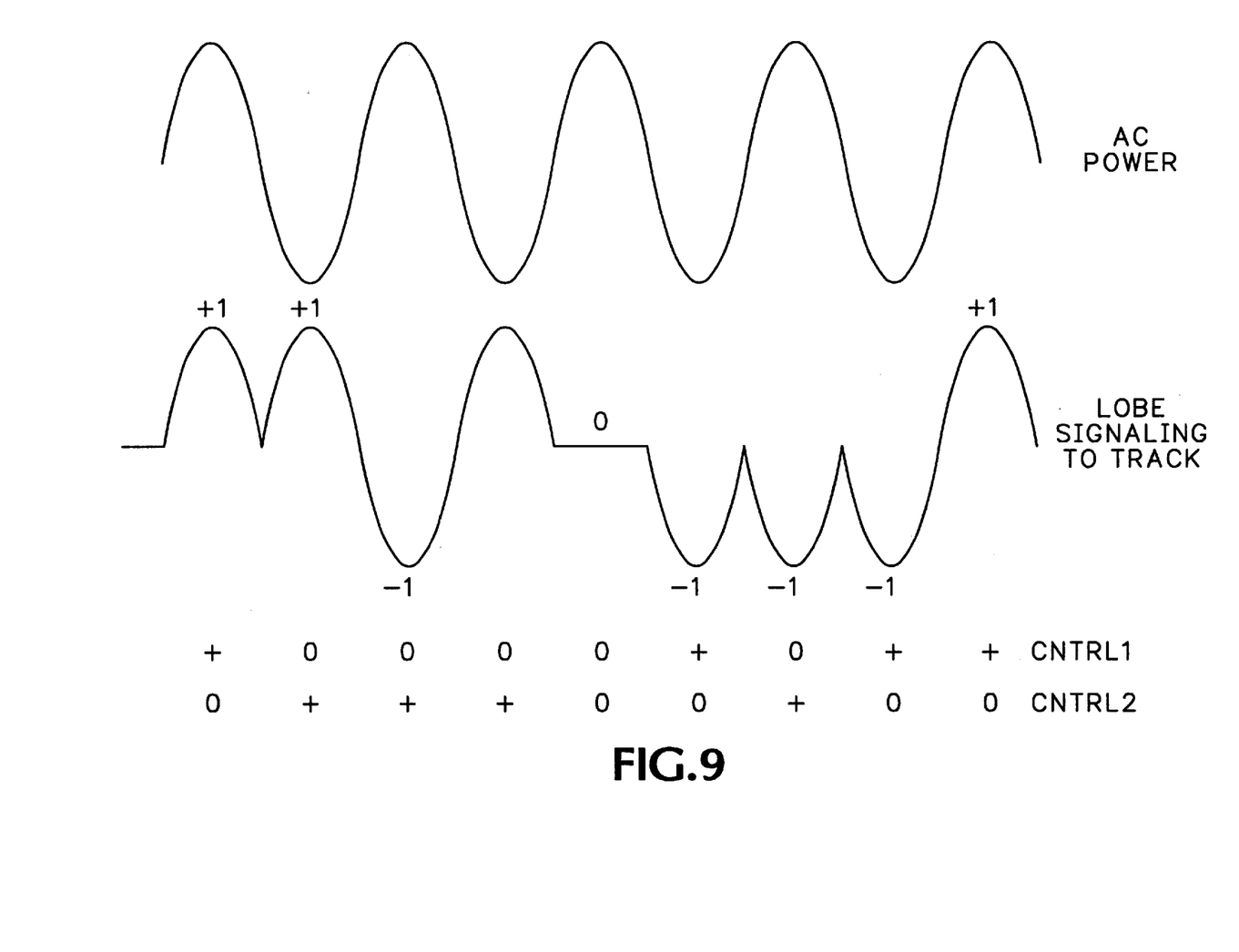
FIG. 9 shows illustrative wave forms generated by the circuit in FIG. 8.

An example of producing an specific trinary digital word which is [+1,+1,–1+1,0,–1,–1,–1,+1] along with the appropriate control signal polarities is shown in FIG. 9. For an AC input whose phase starts at 0 degrees, the correct control sequence to apply to CNTRL1 is [+,0,0,0,0,+,0,+,+] and the correct control sequence to apply to CNTRL2 is [0,+,+,+, 0,0,+,0,0].

The Receiver

Figure 10A:
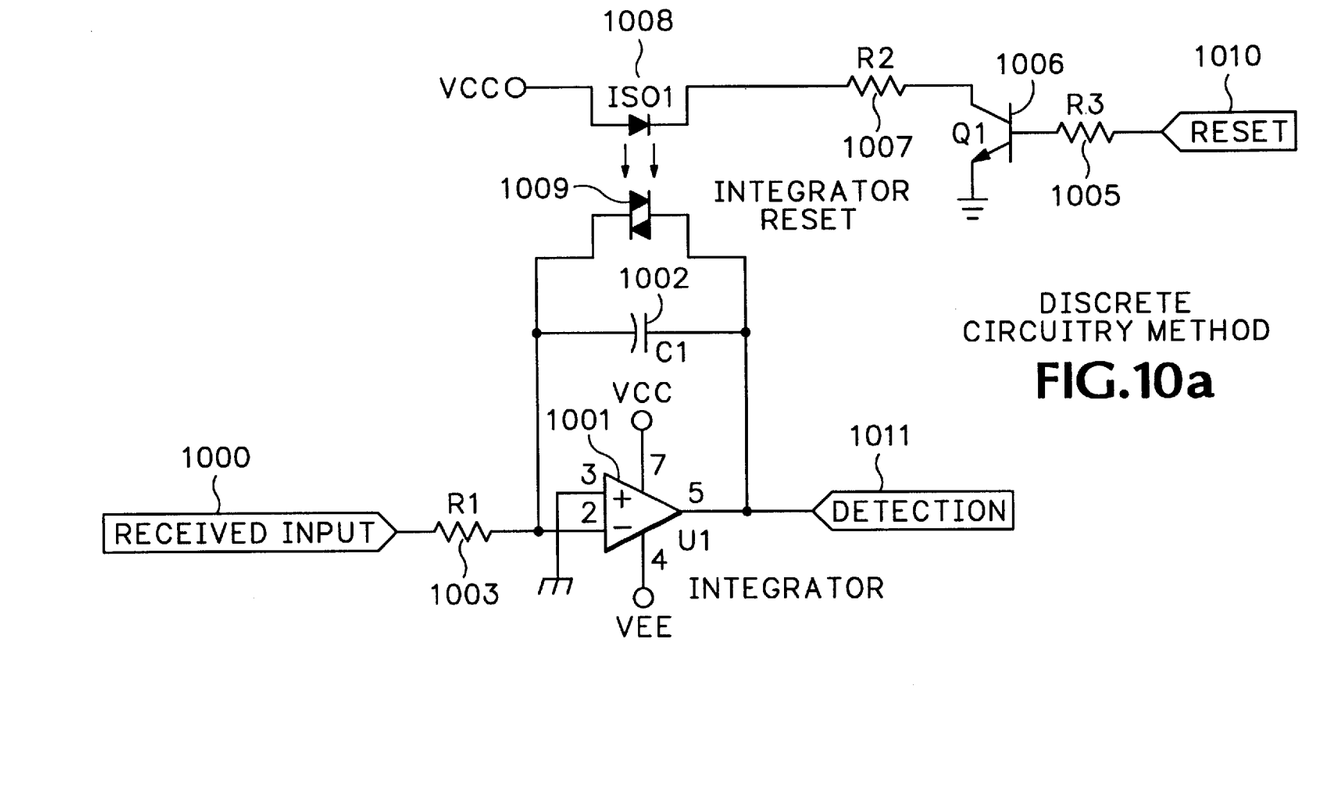
FIGS. 10a and 10b are electrical schematics of a digital lobe receiver.

A simple discrete method: An example of a digital receiver that would be used in a remote object on the track is shown in FIG. 10a. This circuitry is basically a resettable integrator. Lobe signaling from the track is applied to receiver input 1000. The non-inverting input (pin 3) of op amp U1, 1001, is connected to reference (outside track rails). Because of the feedback, this forms a virtual ground at input 2 of op amp U1, 1001.

The capacitor C1, 1002, is discharged at each zero crossing of the original AC power source by using a opto-isolated Triac, TRC1, 1009. Reset is produced by a positive pulse signal at the reset input, 1010. This signal causes current to flow through R3, 1005, and into the base of transistor, 1006, which in turn saturates, Q1, 1006, pulling its collector to near ground. This causes current to flow in resistor, R2, 1007. This current in turn flows through control LED's of opto-isolating triac driver ISO1, 1008. With the control diode conducting, the triac, TRC1, 1009, in turn conducts resetting capacitor voltage on capacitor C1, 1002, to near zero.

The timing of the zero crossings can be reconstructed from the received data. The zero crossings in a data stream which contains lobing has one of the following two characteristics at the zero-crossing points. 1) Either the received signal passes through zero volts—easily detectable with a zero-crossing detector comparator, or, 2) the signal has an extremely high positive or negative derivative—a result of the full-wave rectification at that zero crossing. The inordinately high derivative is easily detected by passing the received signal through a buffer amplifier, on through a derivative discriminator (high-pass filter with appropriate time constants), then through a full-wave bridge circuit to make all of the zero-crossing spikes of the same polarity, then onto a comparator to turn these spikes into logic signals to operate the reset line 1010.

This makes the voltage at the detection output, pin 6, of op amp, U1, 1001 zero volts at the beginning of the next lobe. Op amp 1001, resistor, R1, 1003 and capacitor, 1002 form a simple integrator. When a positive lobe is applied to input 1000, the detection output, 1011, will integrate to a maximum negative value at the next zero crossing just before the command to discharge C1 through triac, TRC1, 1009. A negative value less than a predetermined threshold is determined to represent the detection of a logic +1. When a negative lobe is applied to input 1000, the detection output will integrate to a maximum positive value at the next zero crossing. A positive value greater than a predetermined threshold is determined to represent the detection of a logic −1. When no lobe is applied to input 1000, the detection output will integrate to a value near zero at the next zero crossing. An absolute value less than a predetermined threshold is determined to represent the detection of a logic 0.

Figure 10B:
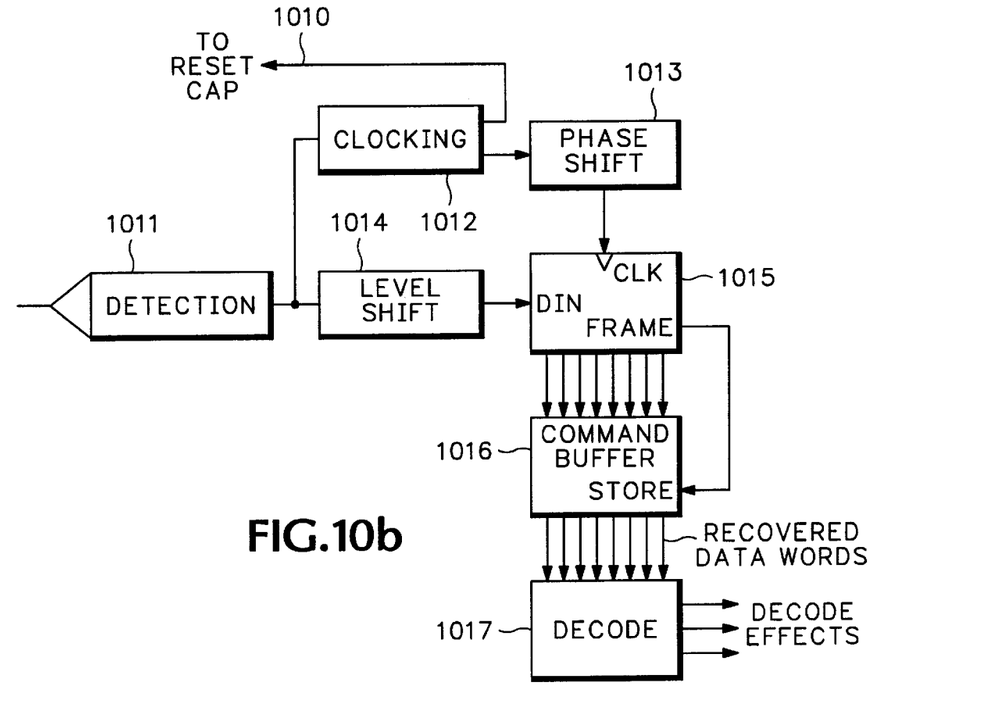
Figure 10C:
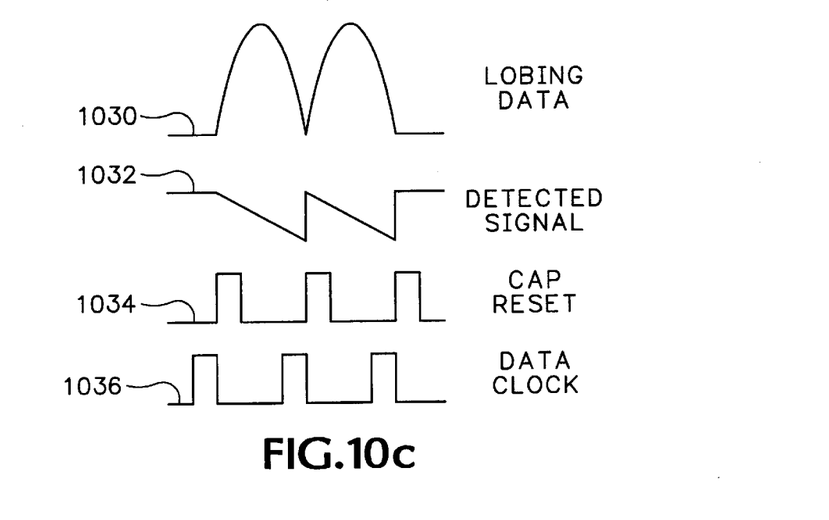
FIG. 10c shows sample wave forms illustrating operation of the receiver of FIGS. 10a and 10b.

FIG. 10c is a series of wave forms illustrating operation of the circuitry of FIG. 10a. Waveform 1030 illustrates lobing data applied to the input of the circuit of FIG. 10a at input terminal 1000. Waveform 1032 illustrates the detected signal that appears at the detection terminal 1011 in FIG. 10a. Waveform 1034 shows the capacitor reset signal applied to terminal 1010 of FIG. 10a. Finally, waveform 1036 illustrates the data clock signal that appears at the input to shift register 1015 of FIG. 10b.

FIG. 10b shows a block diagram of a typical receiver arrangement. Block 1011 performes the basic signal detection from the received input. The output from 1011 is passed to a clock generation block 1012 which creates zero-crossing pulses to operate the capacitor reset line 1010. The output of the clock recovery block 1012 also goes to a phase shift block 1013 which will produce a data-shift pulse just prior to the next zero crossing. This way, detector block 1011 will have produced a signal with the maximum signal to noise ratio. The detection output (from 1011) is passed through a level-shift/attenuator block, 1014 which produces logic signals at its output from detection signals at its input. The logic signals at the output of 1014 are now clocked into a shift register 1015 which serves as a serial-to-parallel converter for the detected bits. Thus, the output of 1015 are detected command words. To achieve proper data registration of the bits into words, 1016 also contains circuitry to detect the word-start signal in order to properly frame the bits into words. When the frame signal is asserted from 1015 into the command buffer, 1016, the parallel data bits at the output of 1015 are stored into the command buffer. This reconstructs the data words as they were created at the transmitter. After capturing these data words, command-decode block 1017 will activate specific desired effects. The output of 1016 may also represent address or command information to be used directly.

The circuitry shown in FIGS. 10a and 10b are but one of many specific possible methods to recover and use the data that was contained in a data stream that uses lobing as its signal form.

Referring to the receiver of FIG. 10a, in operation:

When 1501 fires, voltage on C1 goes to approximately zero;

Reset pulses to +5V immediately after detection is evaluated;

R1 and C1 chosen to detect several volts over the time frame of 8 mS;

Detection is evaluated at phase −180 deg AC power phase and at phase −360 deg AC power phase, and;

At each detection time, a negative voltage means positive lobe was sent; a positive voltage means negative lobe was sent.

Figure 11:
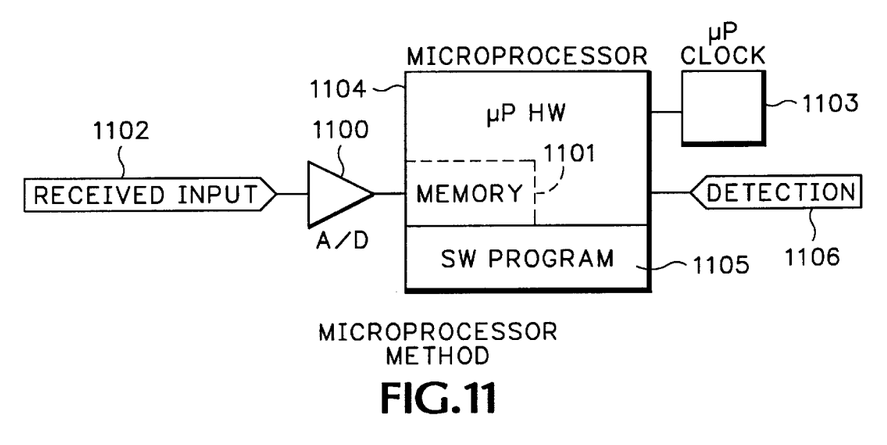
FIG. 11 illustrates a microprocessor implementation of a digital lobe receiver.

Microprocessor method: Another way to implement the receiving function, shown in FIG. 11, is by the use of a microprocessor, 1104, running appropriate software, 1105. In this case, the signal input is digitized by analog to digital converter, 1100, and stored in microprocessor memory, 1101. Zero crossing for the date are reconstructed directly from calculations performed on a history of the received input 1102. Integration is perform between each zero crossing by software routines and detection decisions are made on the results and presented to detection output, 1106.

Having illustrated and described the principles of my invention in a preferred embodiment thereof, it should be readily apparent to those skilled in the art that the invention can be modified in arrangement and detail without departing from such principles. We claim all modifications coming within the spirit and scope of the accompanying claims.

We claim:

1. A method of remotely controlling a selected effect in a model railroad layout having a track, the method comprising the steps of:

providing a receiver coupled to the track in the model railroad layout;

encoding a desired command so as to form a digital command word for transmission to the receiver over the track, the digital command word consisting of a series of bits;

providing an AC track power signal;

for each bit in the series of bits that has a first binary state, positively full-wave rectifying the AC track power signal over one-half cycle beginning at a zero-crossing of the AC track power signal, so as to form a positive AC lobe;

for each bit in the series of bits having a second binary state opposite the first binary state, negatively full-wave rectifying the AC track power signal over one-half cycle beginning at a zero-crossing of the AC track power signal so as form a negative AC lobe;

sequentially applying the positive and negative AC lobes to the track until the series of bits is completed, thereby applying a selectively rectified AC track power signal to the track;

receiving the AC track power signal in the receiver coupled to the track;

recovering the digital command word from the received AC track power signal; and controlling the selected effect in the model railroad layout in response to the recovered digital command word, whereby the AC track power signal itself carries the digital command information over the track to the receiver.

2. A method according to claim 1 wherein the digital word comprises a predetermined unit identification number for addressing a corresponding unit on the model railroad layout.

3. A method according to claim 1 wherein the digital word comprises a desired locomotive speed level.

4. A method according to claim 1 wherein the digital word comprises a desired change in locomotive speed level.

5. A method according to claim 1 wherein the digital word identifies a predetermined effect for selecting the effect.

6. A method according to claim 1 wherein the digital word comprises a command for starting or terminating an effect.

7. A method according to claim 6 wherein the effect is one of a light effect and a sound effect.

8. A method according to claim 1 wherein the command word includes a unit identification number for addressing a corresponding unit on the model railroad layout and further comprising repeating the foregoing steps so as to transmit a second command word to control a selected effect in the said corresponding unit addressed by the first command word.

9. A method according to claim 1 wherein the digital word encodes a selected analog value for controlling operation of a previously selected effect.

10. A method of remotely controlling a selected effect in a model railroad layout having a track, the method comprising the steps of:

providing a receiver coupled to the track in the model railroad layout;

encoding a command for controlling the selected effect in the form of a trinary command word, the trinary command word consisting of a series of data elements), each data element having a state that is one of exactly three predetermined trinary states;

providing an AC track power signal;

for each data element in the series that has a first one of said trinary states, positively full-wave rectifying the AC track power signal over one-half cycle beginning at a zero-crossing of the AC track power signal, so as to form a positive AC lobe;

for each data element in the series that has a second one of said trinary states, forming a zero lobe over one-half cycle beginning at a zero-crossing of the AC track power signal;

for each data element in the series that has a third one of said trinary states, negatively full-wave rectifying the AC track power signal over one-half cycle beginning at a zero-crossing of the AC track power signal, so as to form a negative AC lobe;

concatenating the positive AC lobes, negative AC lobes and zero lobes in the same sequence as the series of data elements so as to form a modified AC track power signal;

applying the modified AC track power signal to the track;

receiving the modified AC track power signal in the receiver coupled to the track;

recovering the trinary command word from the received AC track power signal; and controlling the selected effect in the model railroad layout in response to the recovered trinary command word, whereby the AC track power signal itself carries the command information to the receiver.

11. A method according to claim 10 wherein the trinary command word comprises a predetermined unit identification number for addressing a corresponding unit on the model railroad layout.

12. A method according to claim 10 wherein the trinary command word comprises a desired locomotive speed level.

13. A method according to claim 10 wherein the trinary command word comprises a desired change in locomotive speed level.

14. A method according to claim 10 wherein the trinary command word identifies a predetermined effect for selecting the effect.

* * * * *